(12) United States Patent
Czach et al.

(10) Patent No.: US 8,353,530 B2
(45) Date of Patent: Jan. 15, 2013

(54) INFLATABLE AIRBAG ASSEMBLIES WITH ANTI-SLIP PATCHES

(75) Inventors: Brian Czach, Shelby Township, MI (US); Dana Wold, Farmington Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 5 days.

(21) Appl. No.: 12/775,714

(22) Filed: May 7, 2010

(65) Prior Publication Data

US 2011/0272928 A1 Nov. 10, 2011

(51) Int. Cl.
*B60R 21/16* (2006.01)

(52) U.S. Cl. .................. 280/730.2; 280/743.1; 280/749

(58) Field of Classification Search ............ 280/730.2, 280/749, 743.1, 731
See application file for complete search history.

(56) References Cited

U.S. PATENT DOCUMENTS

| | | | |
|---|---|---|---|
| 5,114,180 A * | 5/1992 | Kami et al. ............. 280/743.1 |
| 6,648,368 B2 | 11/2003 | Smith et al. |
| 6,733,035 B2 | 5/2004 | Thomas et al. |
| 6,796,576 B2 | 9/2004 | Aoki et al. |
| 6,843,502 B2 | 1/2005 | Aoki et al. |
| 7,083,188 B2 | 8/2006 | Henderson et al. |
| 7,121,579 B2 | 10/2006 | Ochiai et al. |
| 7,134,682 B2 | 11/2006 | Totsuka et al. |
| 7,159,895 B2 | 1/2007 | Aoki et al. |
| 7,159,896 B2 | 1/2007 | Ochiai et al. |
| 7,513,522 B2 | 4/2009 | Tanaka et al. |
| 7,775,551 B2 * | 8/2010 | Bowers ...................... 280/729 |
| 7,951,437 B2 * | 5/2011 | Keshavaraj et al. ......... 428/35.7 |

FOREIGN PATENT DOCUMENTS

JP 10278723 10/1998

* cited by examiner

*Primary Examiner* — Eric Culbreth
(74) *Attorney, Agent, or Firm* — Sally J. Brown; Stoel Rives LLP

(57) ABSTRACT

Inflatable curtain airbags can be used to mitigate the likelihood of an occupant being ejected from a vehicle through a side window. Inflatable curtain airbags are typically tethered to a vehicle structure on a car-forward side, but may not be tethered to a vehicle structure on their car-rearward side. Increased friction between the car-rearward side of the airbag and an adjacent vehicle structure can be used to help the airbag say in place, and thereby decrease the likelihood of an occupant passing the airbag and being ejected from the vehicle.

11 Claims, 13 Drawing Sheets

INFLATABLE AIRBAG ASSEMBLIES WITH ANTI-SLIP PATCHES

TECHNICAL FIELD

The present disclosure relates generally to the field of automotive protective systems. More specifically, the present disclosure relates to inflatable curtain airbags.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, chemical, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

Inflatable curtain airbags may be used to protect the passengers of a vehicle during a side collision or roll-over event. Inflatable curtain airbags typically extend longitudinally within the vehicle and are usually coupled to or next to the roof rail of the vehicle. The inflatable curtain airbag may expand in a collision scenario along the side of the vehicle between the vehicle passengers and the side structure of the vehicle. In a deployed state, an inflatable curtain airbag may cover at least a portion of side windows and a B-pillar of the vehicle. In some embodiments, inflatable curtain airbags may extend from an A-pillar to a C-pillar of the vehicle. In alternative embodiments, inflatable curtain airbags may extend from the A-pillar to a D-pillar of the vehicle.

Inflatable curtain airbags are typically installed adjacent to the roof rail of a vehicle in an undeployed state, in which the inflatable curtain airbag is rolled or folded or a combination thereof and retained in the folded or rolled configuration by being wrapped at certain points along the airbag. In this state, the airbag may be said to be in a packaged configuration. When deployed, the airbag exits the packaged configuration and assumes an extended shape. When extended and inflated, the airbag may be said to comprise a deployed configuration.

Figure 1A:
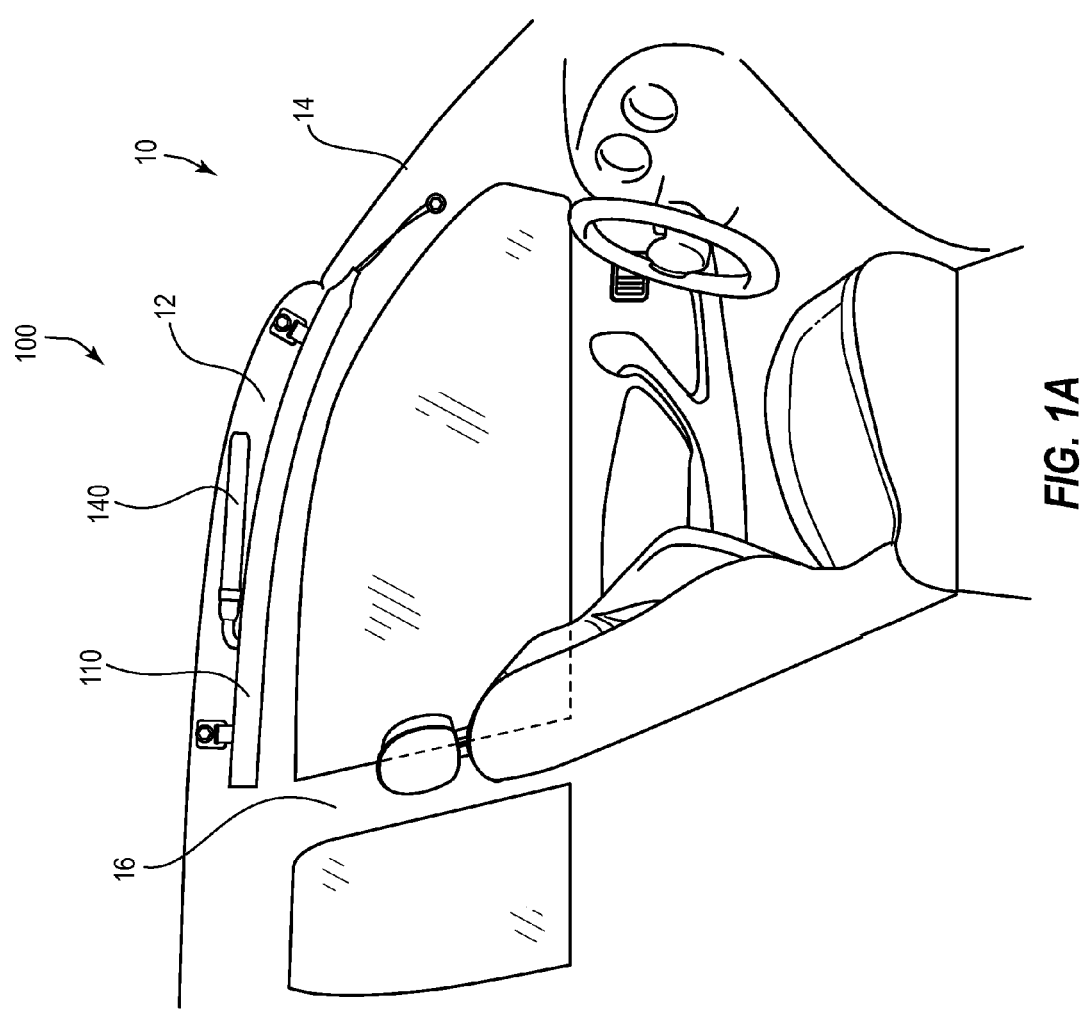
FIG. 1A is a perspective view of one embodiment of an airbag assembly, wherein the airbag assembly is in a packaged configuration.

FIG. 1A depicts airbag assembly 100 from a perspective view, wherein an inflatable curtain airbag 110 that is in a packaged configuration and is mounted adjacent a vehicle roof rail 12 of a vehicle 10. Airbag assembly 100 may comprise inflatable curtain airbag 110, an anti-slip patch 120, and an inflator 140, coupled to a throat portion of the airbag. Assembly 100 may further comprise one or more external tethers 105. In the depicted embodiment, airbag 110 is an inflatable curtain airbag cushion, which extends from an A-pillar 14 to a B-pillar 16. In other embodiments, inflatable curtain airbag 110 may extend from an A-pillar to a C-pillar or a D-pillar, if present.

Figure 1B:
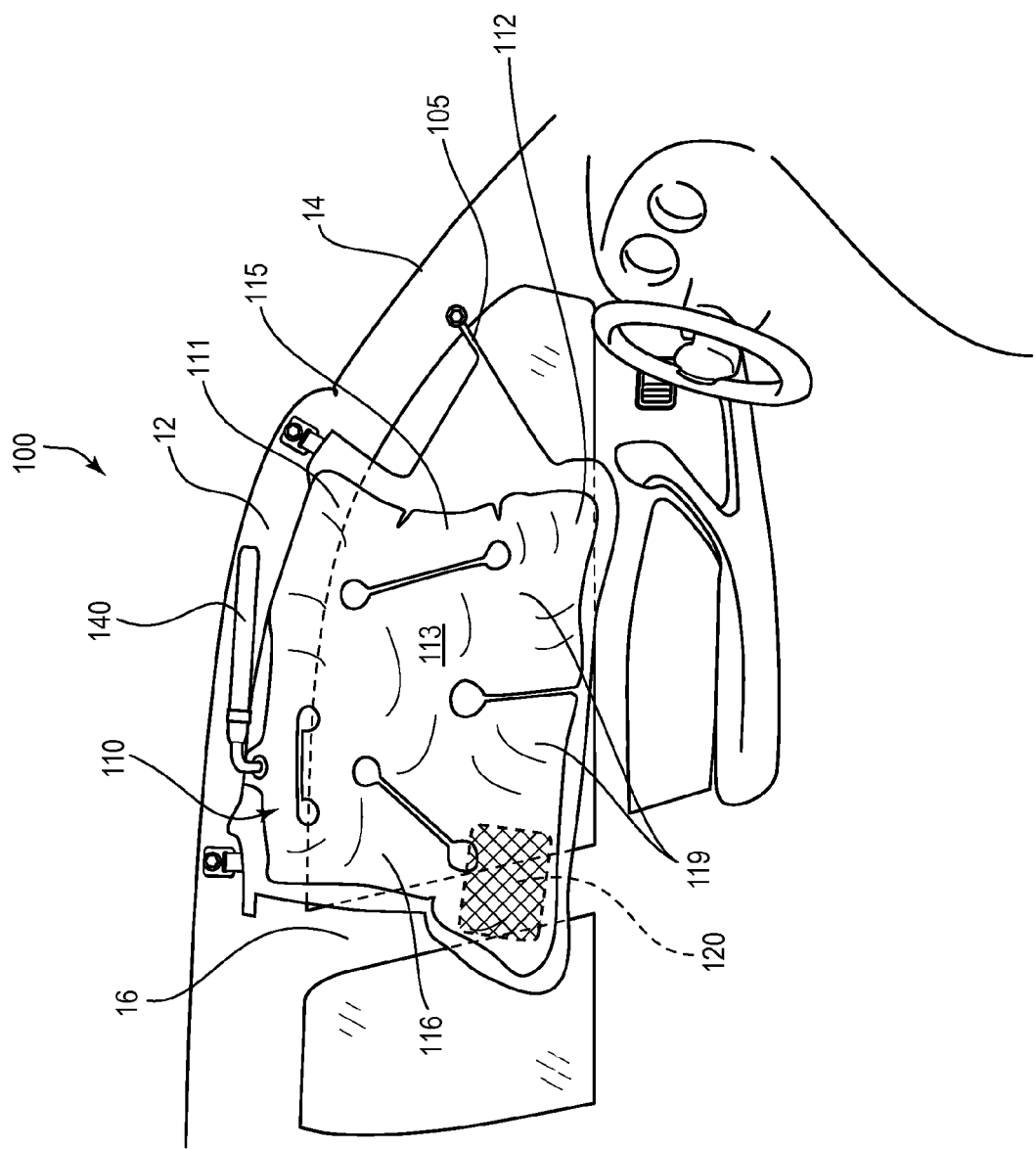
FIG. 1B is a perspective view of the airbag assembly of FIG. 1A, wherein the inflatable curtain airbag is in a deployed configuration.

FIG. 1B is a perspective view of assembly 100, wherein inflatable curtain airbag 110 is depicted in a deployed configuration. Inflatable curtain airbag 110 is configured to become inflated upon activation of one or more inflators such that the inflatable curtain airbag transitions from the packaged configuration to the deployed configuration. Inflatable curtain airbag 110 may be described as having an upper portion 111, a lower portion 112, an inboard panel 113, an outboard panel (not visible), and a throat portion, which may also be called an inflator attachment portion. The throat portion may be closed around inflator 140, and the inflator mounted to the roof rail of the vehicle via an inflator mounting bracket. The various panels of inflatable curtain airbag 110 define an interior inflatable void, which is in fluid communication with inflator 140. The inflatable void may be divided into inflation cells 119. The various panels of inflatable curtain airbag 110 may comprise panels of a woven fabric, such as nylon, that are coupled together at a seam.

Upper portion 111 of inflatable curtain airbag 110 is the portion of the curtain airbag that is closest to the headliner of a vehicle when the airbag is in a deployed state. Lower portion 112 is below upper portion 111 when inflatable curtain airbag 110 is in a deployed state, and is closest to a floor of the vehicle. The term "lower portion" is not necessarily limited to the portion of inflatable curtain airbag 110 that is below a horizontal medial plane of the inflatable curtain airbag, but may include less than half, more than half or exactly half of the bottom portion of the inflatable curtain airbag. Likewise, the term "upper portion" is not necessarily limited to the portion of inflatable curtain airbag 110 that is above a horizontal medial plane of the inflatable curtain airbag, but may include less than half, more than half or exactly half of the top portion of the inflatable curtain airbag.

Anti-slip patch 120 may comprise a piece of material or a substance coupled to inflatable curtain airbag 110. Anti-slip patch 120 functions to increase friction between the airbag to which it is coupled and a vehicle structure. A vehicle structure may comprise a vehicle occupant, or a portion of the vehicle, such as a window sill, pillar, or roof rail. In the depicted embodiment, anti-slip patch 120 is configured to interact with B-pillar 16, when the airbag is in the deployed and inflated configuration. In case of a collision or rollover, an occupant may strike airbag 110. On car-forward side 115, airbag 110 is tethered to A-pillar 14 via tether 105; however, on car-rearward side 116, lower portion 112 of airbag 110 is not attached to a vehicle structure, such as B-pillar 16. As such, airbag 110 may swing toward the outboard side of the vehicle, and an occupant may be ejected from the vehicle by passing airbag 110 and exiting via a window. Anti-slip patch 120 is configured to increase an amount of energy required to push airbag 110 toward and/or through an outboard side window by increasing friction between the airbag and B-pillar 16.

One skilled in the art will recognize that anti-slip patch 120 may be placed in a variety of predetermined locations such that the anti-slip patch will interact with a variety of predetermined vehicle structures. As such, the anti-slip patch may comprise a plurality of distinct anti-slip patches, wherein each anti-slip patch comprises a different material or substance. For example, an airbag may comprise two anti-slip patches that are configured to interact with different vehicle structures. Also, each of the vehicle structures may comprise materials having different properties such that each of the anti-slip patches need to have different properties. In this way, a coefficient of friction between each anti-slip patch and the vehicle structure can be optimized. Likewise, the size and/or shape of each anti-slip patch may be altered to achieve a desired amount of friction with the vehicle structure.

In various embodiments, the anti-slip patch may be described as tacky, sticky, rubbery, rough, or smooth. In various embodiments, the anti-slip patch may comprise silicone, with or without an additional top coating; urethane: with or without an additional top coating; an adhesive; neoprene; rubber; or any other suitable material. The anti-slip patch may be formed by the selective omission, removal, or masking of a friction reducing topcoat or other friction modifier. The anti-slip patch may be configured to interact with a predetermined vehicle structure material, such that the material from which the anti-slip patch is formed may vary to achieve a predetermined level of friction with the material from which the vehicle structure is formed. The materials from which the vehicle structures may be formed include plastic, metal, cloth, rubber, or any other material known in the art. Also, the material from which the anti-slip patch is formed may be varied to achieve a predetermined level of friction with the material presented by the occupant that the curtain is intended to contain.

As will be appreciated by those skilled in the art, a variety of types and configurations of inflatable curtain airbags can be utilized without departing from the scope and spirit of the present disclosure. For example, the size, shape, and proportions of the airbag membrane may vary according to its use in different vehicles or different locations within a vehicle such that the airbag may comprise an inflatable curtain cushion; a rear passenger side airbag; a driver's airbag; and/or a front passenger airbag. Also, the airbag may comprise one or more of any material well known in the art, such as a woven nylon fabric, which may be coated with a substance, such as silicone. Additionally, the airbag cushion may be manufactured using a variety of techniques such as one piece weaving, cut and sew, or a combination of the two techniques.

During a collision or rollover, an occupant may impact airbag 110 such that a force is applied to the airbag in an inboard to outboard direction, such that the airbag tends to be pushed toward B-pillar 16, as well as a side window that borders B-pillar 16. As a result, bottom portion 112 of airbag 110 may swing upwardly, in relation to a window sill, and outboard side 121 of anti-slip patch 120 may contact inboard side 17 of B-pillar 16. Without anti-slip patch 120, the airbag may slip off the B-pillar and allow the bottom of the airbag to continue to swing upwardly and/or allow the airbag to be pushed out a side window adjacent to the B-pillar. With anti-slip patch 120, the amount of force required to allow the bottom of the airbag to continue to swing upwardly and/or allow the airbag to be pushed out a side window adjacent to the B-pillar is increased. As a result, the bottom of the airbag may not swing out, and thereby create a gap between a window sill of the vehicle and the bottom of the airbag. Also, friction between the anti-slip patch and the B-pillar may not allow the airbag to be pushed out a window that is adjacent to the B-pillar. Alternatively, the amount of time required for the bottom of the airbag to swing out and/or the airbag to be pushed out a window adjacent to the B-pillar may be increased as a result of friction between the anti-slip patch and the B-pillar.

Figure 2:
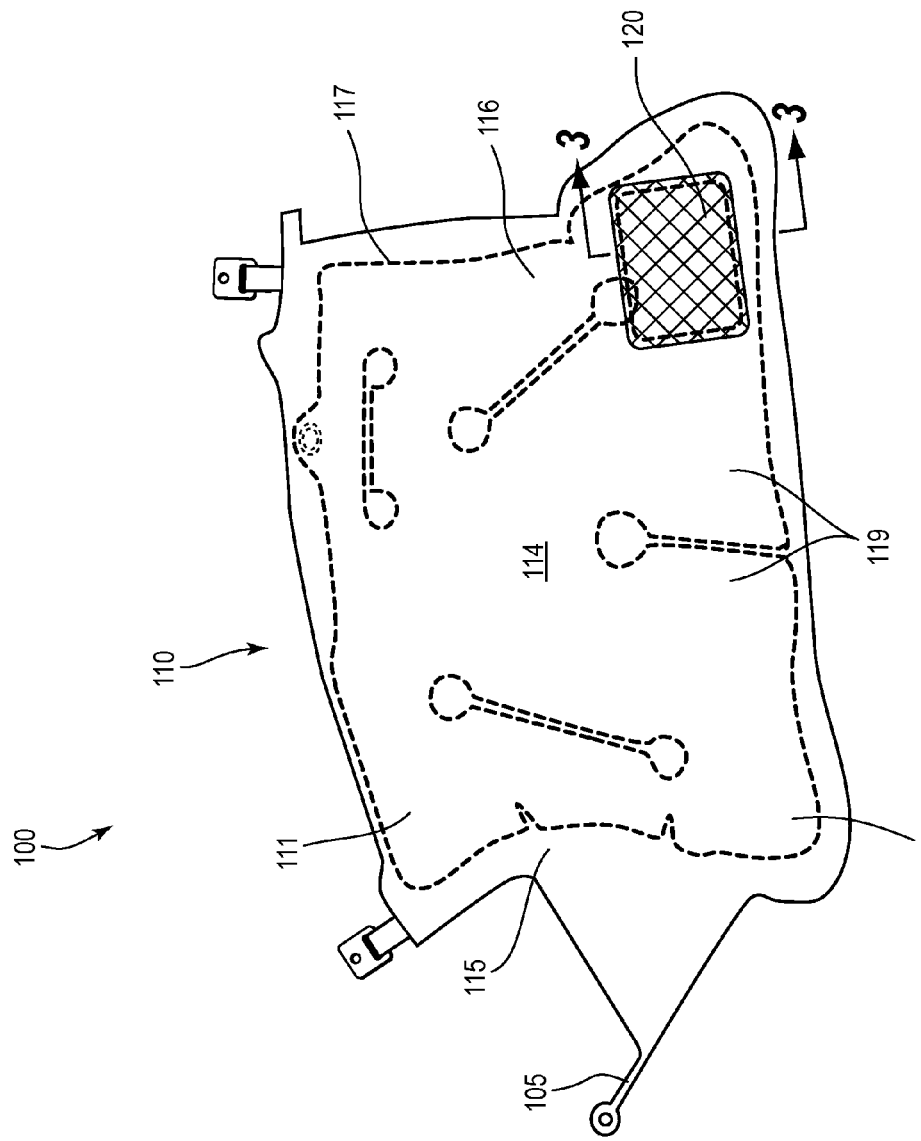
FIG. 2 is a close up side view of the inflatable curtain airbag and anti-slip patch of FIG. 1B.

FIG. 2 is a side view of a portion of airbag assembly 100, wherein outboard panel 114 of airbag 110 is depicted. As described above, airbag 110 has upper portion 111, lower portion 112, inboard panel (not visible), outboard panel 114, car-forward side 115, and car-rearward side 116. The inboard panel and outboard panel 114 are coupled together at a perimeter seam 117, which may comprise stitching. Airbag 110 also has a tether 105, and is divided into inflation cells 119 by interior seams. In the depicted embodiment, anti-slip patch 125 is located at car-rearward side 116 of lower portion 112 of outboard panel 114 of airbag 110. As discussed herein, the location of the anti-slip patch, as well as the number of anti-slip patches may vary according to different embodiments. In the depicted embodiment, anti-slip patch 120 is coupled to outboard panel 114 at a seam 125, which may comprise stitching. In another embodiment, the anti-slip patch may comprise an entirety of the outboard panel.

Figure 3:
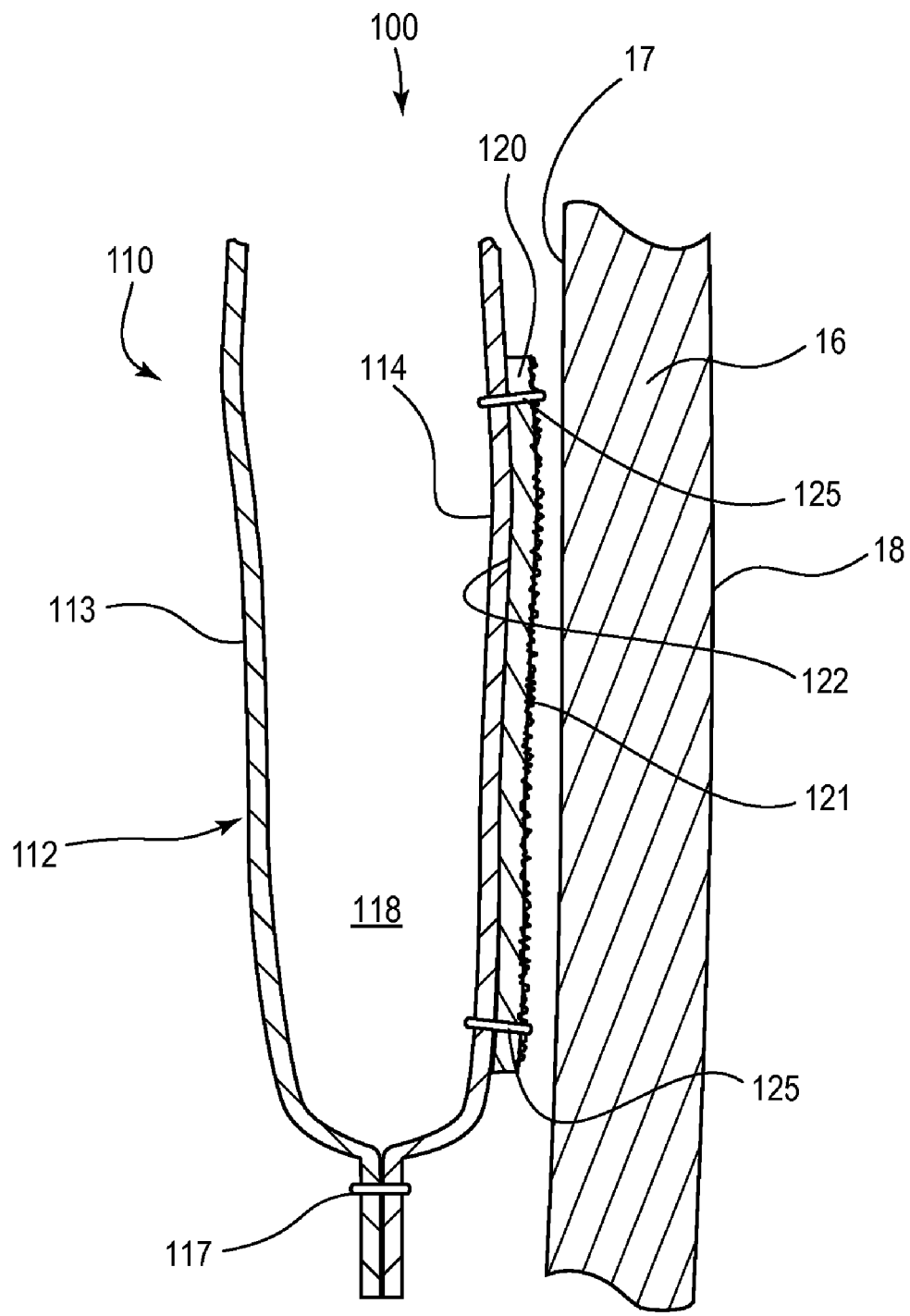
FIG. 3 is a cross-sectional view of the inflatable curtain airbag and anti-slip patch of FIG. 2.

FIG. 3 is a cross-sectional view of a portion of airbag assembly 100, wherein the cross section also depicts B-pillar 16. In the depiction of FIG. 3, airbag 110 and B-pillar 16 are also cutaway, wherein the airbag is in a deployed and inflated configuration adjacent to B-pillar 16. B-pillar 16 comprises an inboard side 17 and an outboard side 18. Inboard panel 113 and outboard panel 114 are coupled at perimeter seam 117 to form inflatable void 118. Anti-slip patch 120 is coupled to an outboard side of outboard panel 114 via stitching 125. Anti-slip patch 120 has an outboard side 121 and an inboard side 122. Outboard and inboard sides 121 and 122 may comprise a single piece of material or a single substance, or alternatively, the inboard and outboard sides may comprise different materials or substances that are coupled together. Inboard side 122 of anti-slip patch 120 is coupled adjacent the outboard side of outboard panel 114 of airbag 110.

During a collision or rollover, an occupant may impact airbag 110 such that a force is applied to the airbag in an inboard to outboard direction, such that the airbag tends to be pushed toward B-pillar 16, as well as a side window that borders B-pillar 16. As a result, bottom portion 112 of airbag 110 may swing upwardly, in relation to a window sill, and outboard side 121 of anti-slip patch 120 may contact inboard side 17 of B-pillar 16. Without anti-slip patch 120, the airbag may slip off the B-pillar and allow the bottom of the airbag to continue to swing upwardly and/or allow the airbag to be pushed out a side window adjacent to the B-pillar. With anti-slip patch 120, the amount of force required to allow the bottom of the airbag to continue to swing upwardly and/or allow the airbag to be pushed out a side window adjacent to the B-pillar is increased. As a result, the bottom of the airbag may not swing out, and thereby create a gap between a window sill of the vehicle and the bottom of the airbag. Also, friction between the anti-slip patch and the B-pillar may not allow the airbag to be pushed out a window that is adjacent to the B-pillar. Alternatively, the amount of time required for the bottom of the airbag to swing out and/or the airbag to be pushed out a window adjacent to the B-pillar may be increased as a result of friction between the anti-slip patch and the B-pillar.

One skilled in the art will recognize that vehicle pillars may comprise a variety of sizes, shapes, and materials. Further a single vehicle pillar may comprise more than one material. For example, one part of a vehicle pillar may comprise plastic and another part may comprise fabric. As such, a single anti-slip patch may comprise a plurality of materials or substances having different properties. Also, a plurality of anti-slip patches may be employed to interact with a single pillar or a plurality of pillars.

Figure 4:
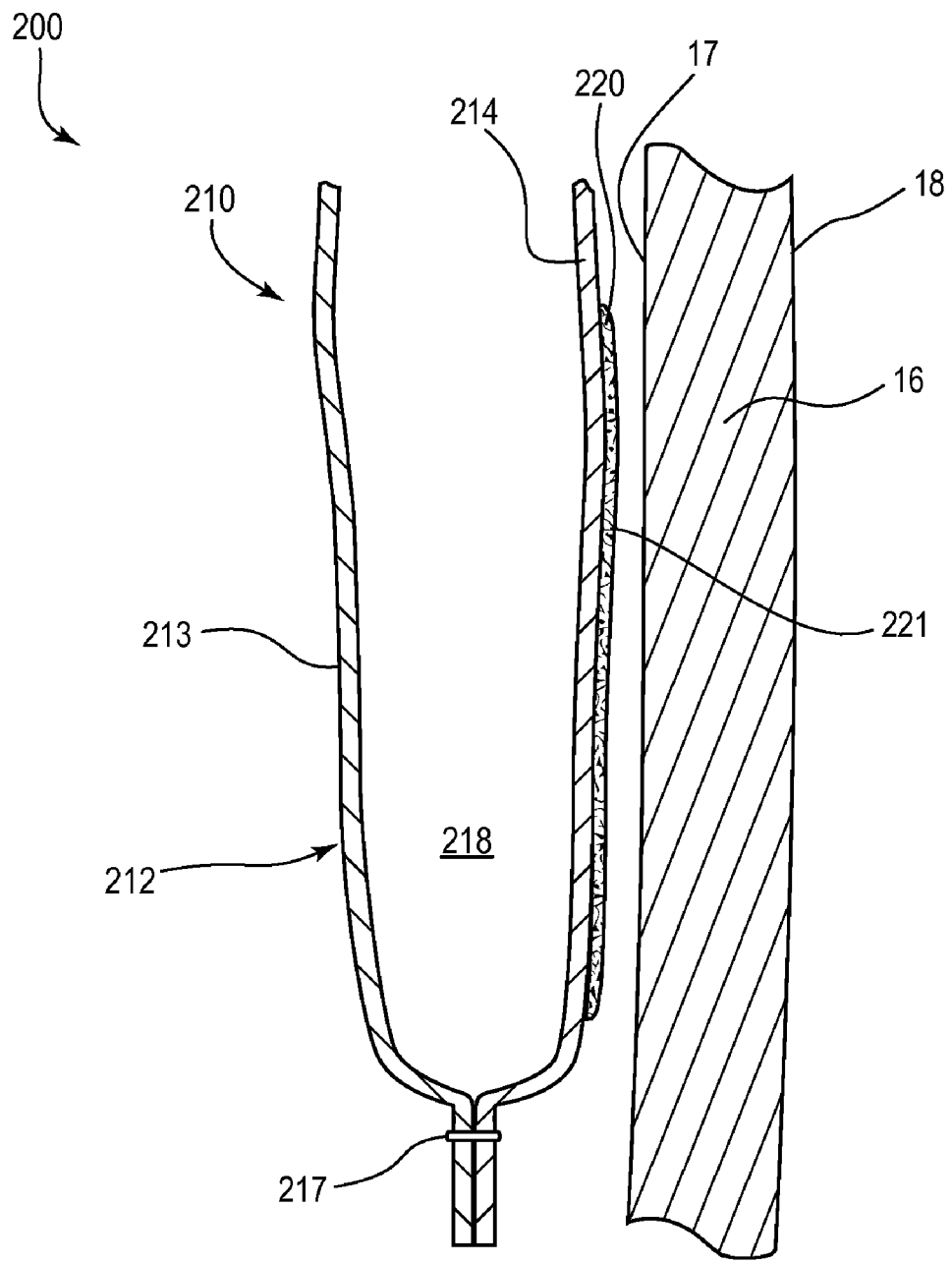
FIG. 4 is a cross-sectional view of another embodiment of an inflatable curtain airbag and anti-slip patch.

FIG. 4 is a cross-sectional view of a portion of airbag assembly 200 with anti-slip patch 220, wherein airbag assembly 200 and anti-slip patch 220 resemble airbag assembly 100 and anti-slip patch 120, described above, in certain respects. Accordingly, like features may be designated with like reference numerals, with the leading hundreds numeral incremented from "1" to "2". Any suitable combination of the features described with respect to airbag assembly 100 and anti-slip patch 120 can be employed with assembly 200 and anti-slip patch 220, and vice versa.

In the depiction of FIG. 4, airbag 210 and B-pillar 16 are cutaway, and airbag 110 is in a deployed and inflated configuration adjacent to B-pillar 16. B-pillar 16 comprises an inboard side 17 and an outboard side 18. Inboard panel 213 and outboard panel 214 are coupled at perimeter seam 217 to form inflatable void 218. Anti-slip patch 220 may comprise a coating applied to an outboard side of outboard panel 214 of airbag 210. In another embodiment, anti-slip patch 220 may comprise an area in which a friction-reducing topcoat has been omitted or removed. Anti-slip patch 220 has an outboard side 221, but since it is a coating of airbag 210, it may or may not be described as having an inboard side. Outboard side 221 of anti-slip patch 220 is configured to increase friction with inboard side 17 of B-pillar 16, when compared to the material from which airbag 210 is made. In another embodiment, the anti-slip patch may comprise an entirety of the outboard panel.

Figure 5:
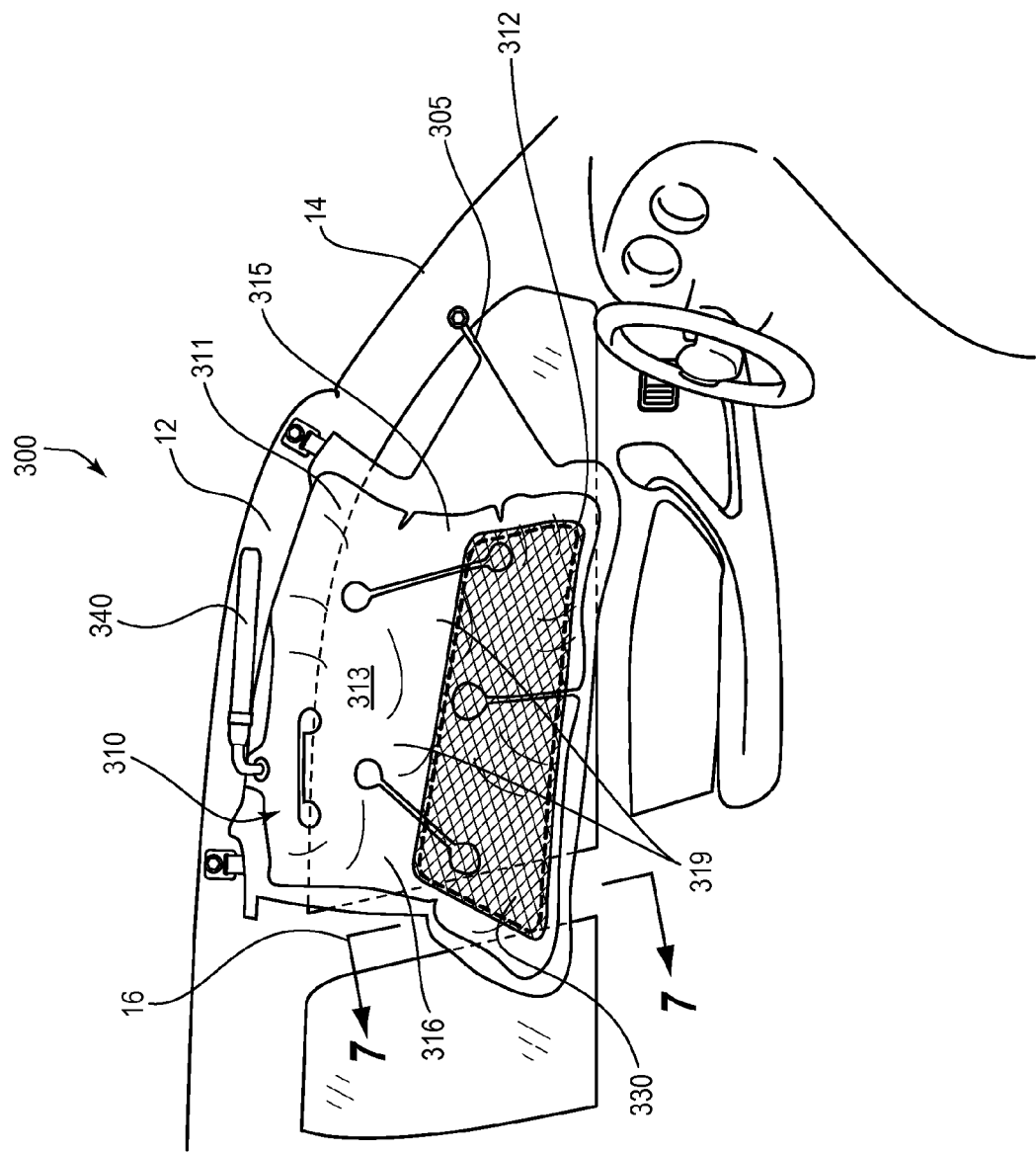
FIG. 5 is a perspective view of another embodiment of an airbag assembly, wherein the inflatable curtain airbag is in a deployed configuration.

FIG. 5 depicts airbag assembly 300 with anti-slip patch 330, wherein airbag assembly 300 and anti-slip patch 330 resemble airbag assemblies 100 and 200, as well as anti-slip patches 120 and 220, described above, in certain respects. Accordingly, like features may be designated with like reference numerals, with the leading hundreds numeral incremented from "1" or "2" to "3". Any suitable combination of the features described with respect to airbag assemblies 100 or 200 and anti-slip patches 120 or 220 can be employed with assembly 300 and anti-slip patch 330, and vice versa.

FIG. 5 is a perspective view of another embodiment of an airbag assembly 300, wherein the assembly comprises an inflatable curtain airbag 310, an inboard anti-slip patch 330, and an inflator 340. Inflatable curtain airbag 310 is depicted in an inflated, deployed configuration and may be mounted adjacent a vehicle roof rail 12 of a vehicle. Assembly 300 may further comprise one or more external tethers 305. In the depicted embodiment, airbag 310 is an inflatable curtain airbag cushion, which extends from an A-pillar 14 to a B-pillar 16. In other embodiments, inflatable curtain airbag 310 may extend from an A-pillar to a C-pillar or a D-pillar, if present.

Inflatable curtain airbag 310 is configured to become inflated upon activation of one or more inflators such that the inflatable curtain airbag transitions from the packaged configuration to the deployed configuration. Inflatable curtain airbag 310 may be described as having an upper portion 311, a lower portion 312, an inboard panel 313, an outboard panel (not visible), and a throat portion, which may also be called an inflator attachment portion. The throat portion may be closed around inflator 340, and the inflator mounted to the roof rail of the vehicle via an inflator mounting bracket. The various panels of inflatable curtain airbag 310 define an interior inflatable void, which is in fluid communication with inflator 340. The inflatable void may be divided into inflation cells 319. The various panels of inflatable curtain airbag 310 may comprise panels of a woven nylon fabric that are coupled together at a seam.

Anti-slip patch 330 may comprise a piece of material or a substance coupled to inflatable curtain airbag 310. Anti-slip patch 330 functions to increase friction between the airbag to which it is coupled and a vehicle structure, such as a vehicle occupant. In case of a collision or rollover, an occupant may strike airbag 310. On a car-forward side 315, airbag 310 is tethered to A-pillar 14 via tether 305; however, on a car-rearward side 316, lower portion 312 of airbag 310 is not attached to a vehicle structure, such as B-pillar 16. As such, airbag 310 may swing toward the outboard side of the vehicle, and an occupant may be ejected from the vehicle by passing airbag 310 and exiting via a window. Anti-slip patch 330 is configured to increase an amount of energy required to push airbag 310 toward and/or through an outboard side widow by increasing friction between the airbag and an occupant. Anti-slip patch 330 may be centered on airbag 310 or may be biased toward car-forward side 315 or car-rearward side 316. One skilled in the art will recognize that the size and shape of the anti-slip patch may be varied according to different embodiments. Likewise, the location of the anti-slip patch may be varied.

Figure 6:
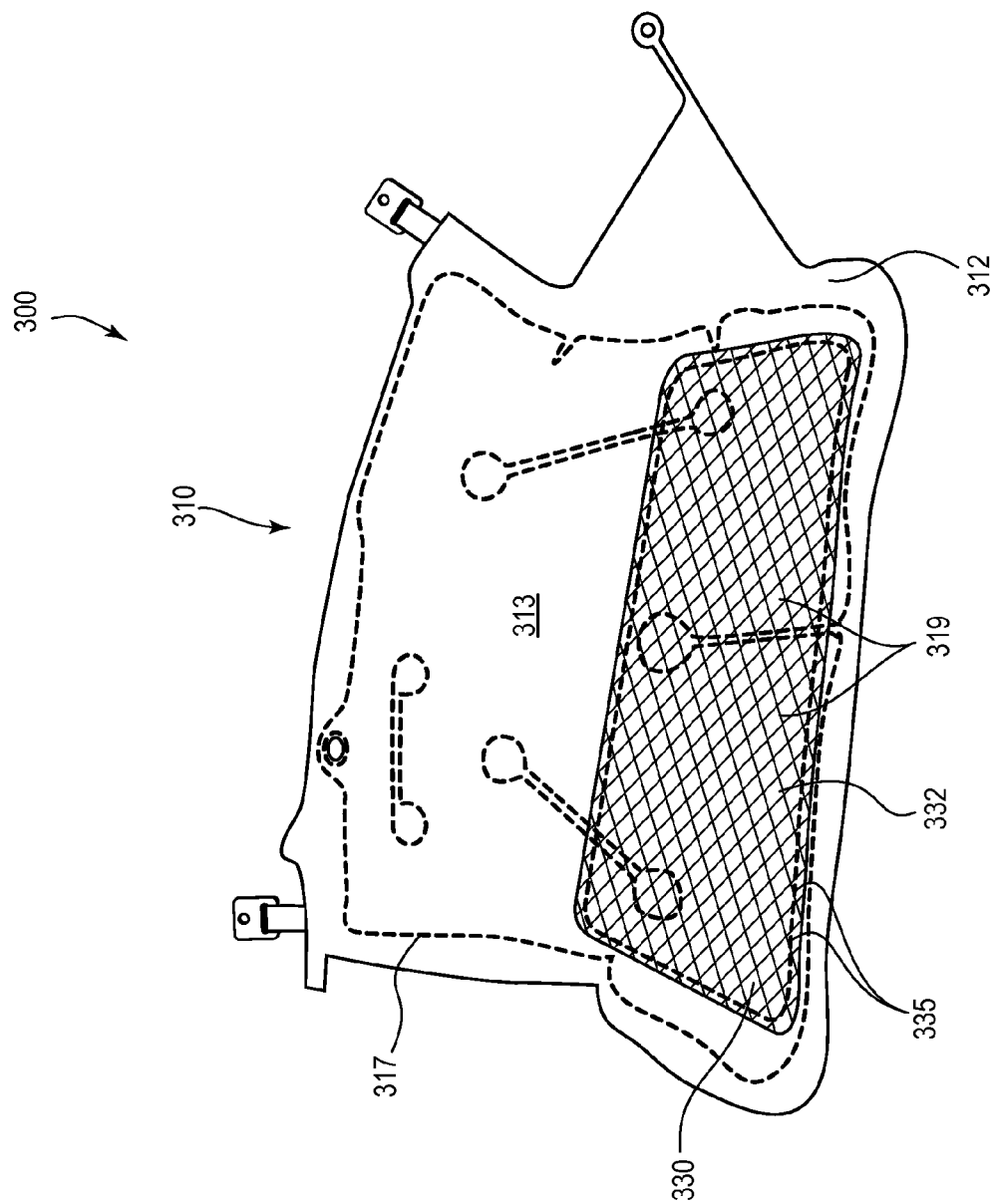
FIG. 6 is a close up side view of the inflatable curtain airbag and anti-slip patch of FIG. 5.

FIG. 6 is a side elevation view of a portion of airbag assembly 300, wherein inflatable curtain airbag 310 and anti-slip patch 330 are depicted in a deployed configuration. Anti-slip patch 330 may be partially located on bottom portion 312 of inboard panel 313 of airbag 310. Anti-slip patch 330 may be coupled to airbag 310 via stitching 335. In some embodiments, a portion of anti-slip patch 330 may be coupled to airbag 310 via seam 317, which couples inboard panel 313 to an outboard panel (not shown). Similarly, a portion of anti-slip patch 330 may be coupled to airbag 310 via the seams that define inflation cells 319. When coupled to airbag 310, anti-slip patch 330 comprises an inboard side 332. In another embodiment, the anti-slip patch may comprise an entirety of the inboard panel.

Figure 7:
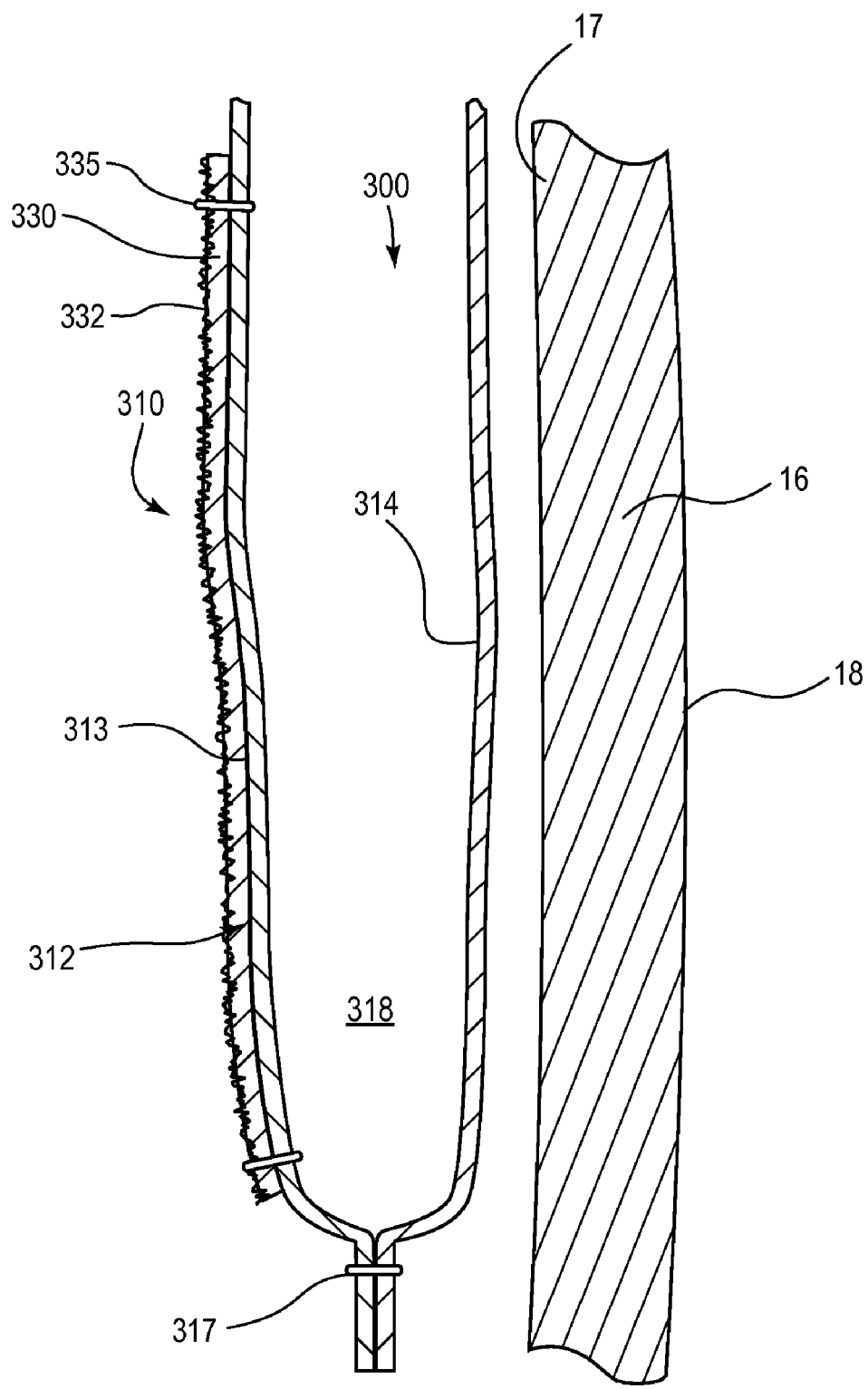
FIG. 7 is a cross-sectional view of the airbag assembly of FIG. 5.

FIG. 7 is a cross-sectional view of a portion of airbag assembly 300. Inflatable airbag curtain 310 is depicted in a deployed and inflated configuration, wherein the airbag is located adjacent to vehicle B-pillar 16, which comprises an inboard side 17 and an outboard side 18. Airbag 310 comprises inboard panel 313 and outboard panel 314, which are coupled together at seam 317 to form an inflatable void 318. Anti-slip patch 330 comprises an inboard anti-slip patch that is coupled to bottom portion 312 of airbag 310 via stitching 335. Inboard side 332 of anti-slip patch 330 is configured to interact with an occupant during a collision scenario.

Figure 9:
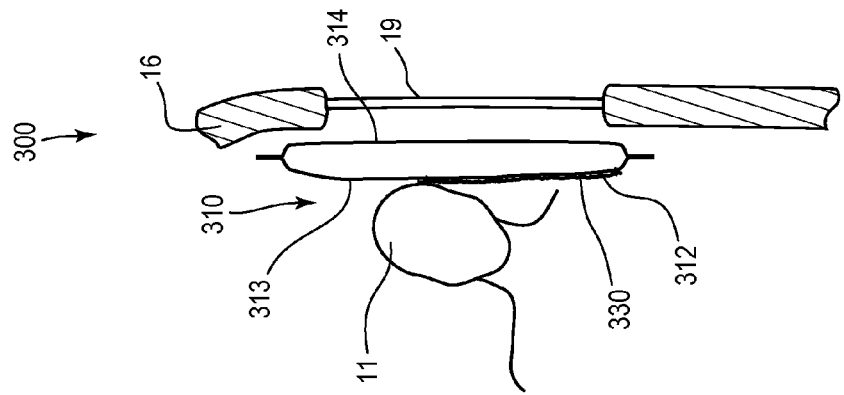
FIG. 9 is a side elevation view of the airbag assembly and occupant of FIG. 8.
Figure 8:
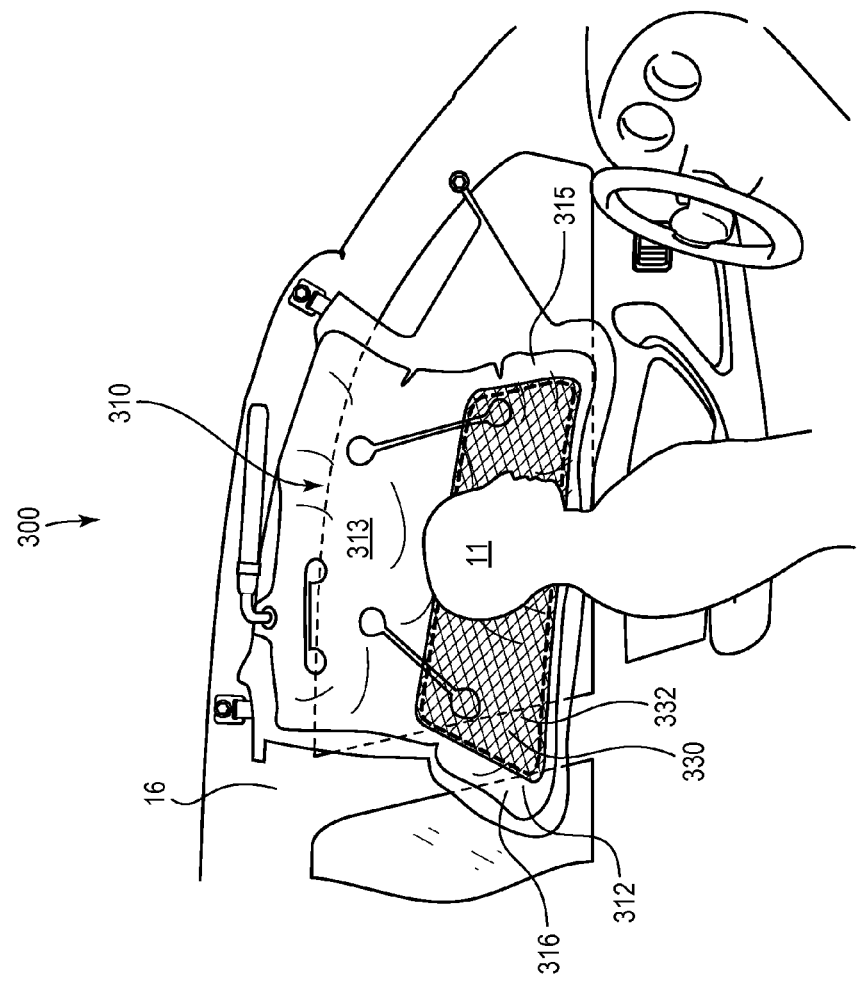
FIG. 8 is a perspective view of the airbag assembly of FIG. 5, wherein an occupant is about to contact the airbag during a collision scenario.

FIGS. 8-9 are a perspective view and a side view, respectively, of airbag assembly 300 of FIG. 5, wherein airbag 310 is in a deployed and inflated configuration and an occupant 11 is about to contact the airbag during a collision event, such as a side-impact or a rollover. Airbag 310 comprises inboard panel 313, outboard panel 314, car-forward side 315, and car-rearward side 316. Anti-slip patch 330 is coupled to inboard panel 313 of airbag 310 at lower portion 312, such that the anti-slip patch comprises an inboard side 332. During a side-impact or rollover the head of occupant 11 may travel in an outboard direction toward B-pillar 16 and window 19.

Figure 11:
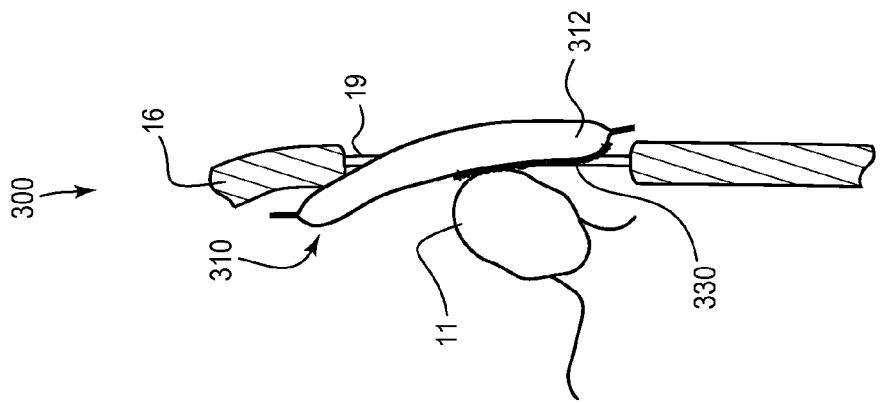
FIG. 11 is a side elevation view of the airbag assembly and occupant of FIG. 10.
Figure 10:
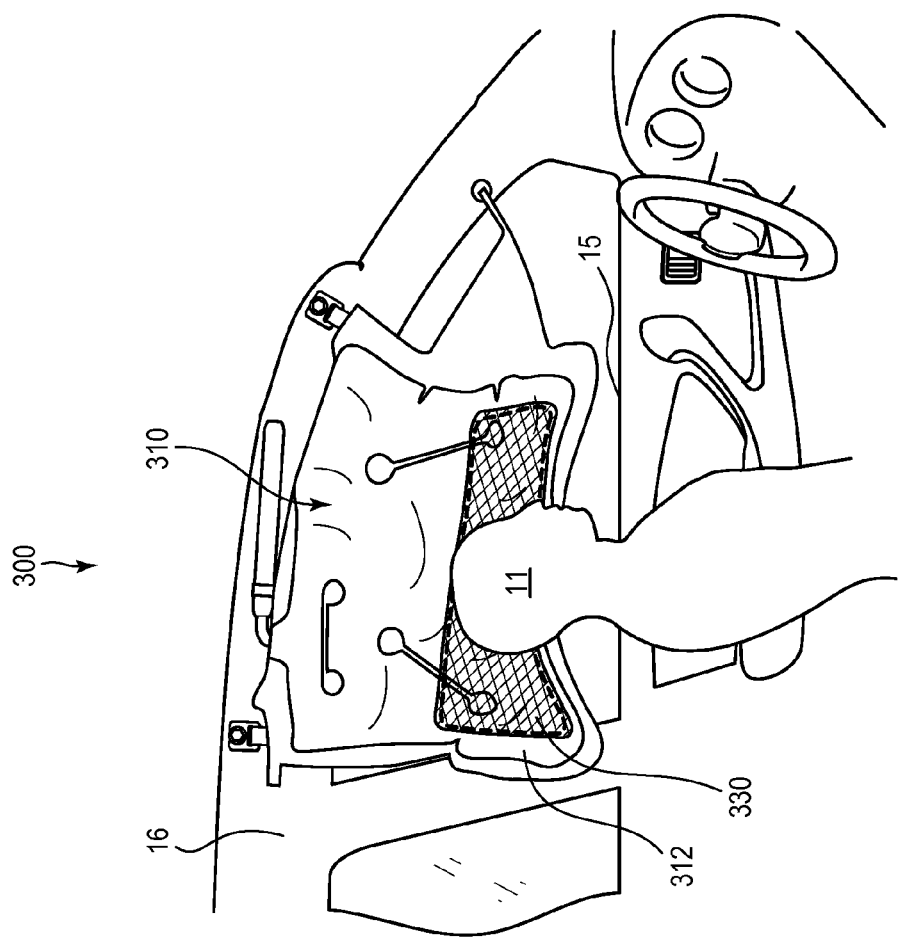
FIG. 10 is a perspective view of the airbag assembly of FIG. 8, wherein an occupant has contacted the airbag.

FIGS. 10-11 are a perspective view and a side view, respectively, of airbag assembly 300 of FIGS. 8-9, at a later time during a collision or rollover event. In the depicted figures, the head of occupant 11 has impacted lower portion 312 of airbag 310 at a place on anti-slip patch 330. During a collision or rollover event, occupant 11 may impact airbag 310 with enough energy to push the airbag through a space formerly occupied by window 19 and partially defined by B-pillar 16. Typically, it is bottom portion 312 of airbag 310 that is pushed in the outboard direction through window 19. As a result, bottom portion 312 of airbag 310 may start to be pushed in a vertically upward direction such that a gap can form between the bottom portion of the airbag and a beltline 15 of the vehicle. Beltline 15 may also be called a window sill.

Figure 13:
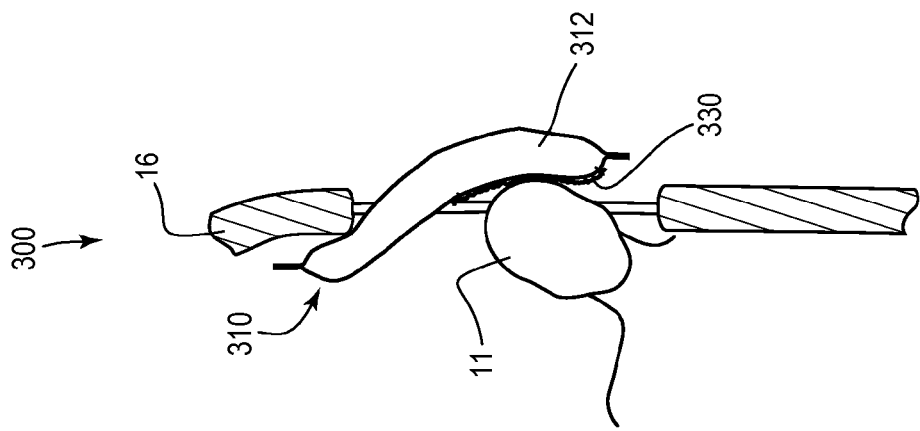
FIG. 13 is a side elevation view of the airbag assembly and occupant of FIG. 12.
Figure 12:
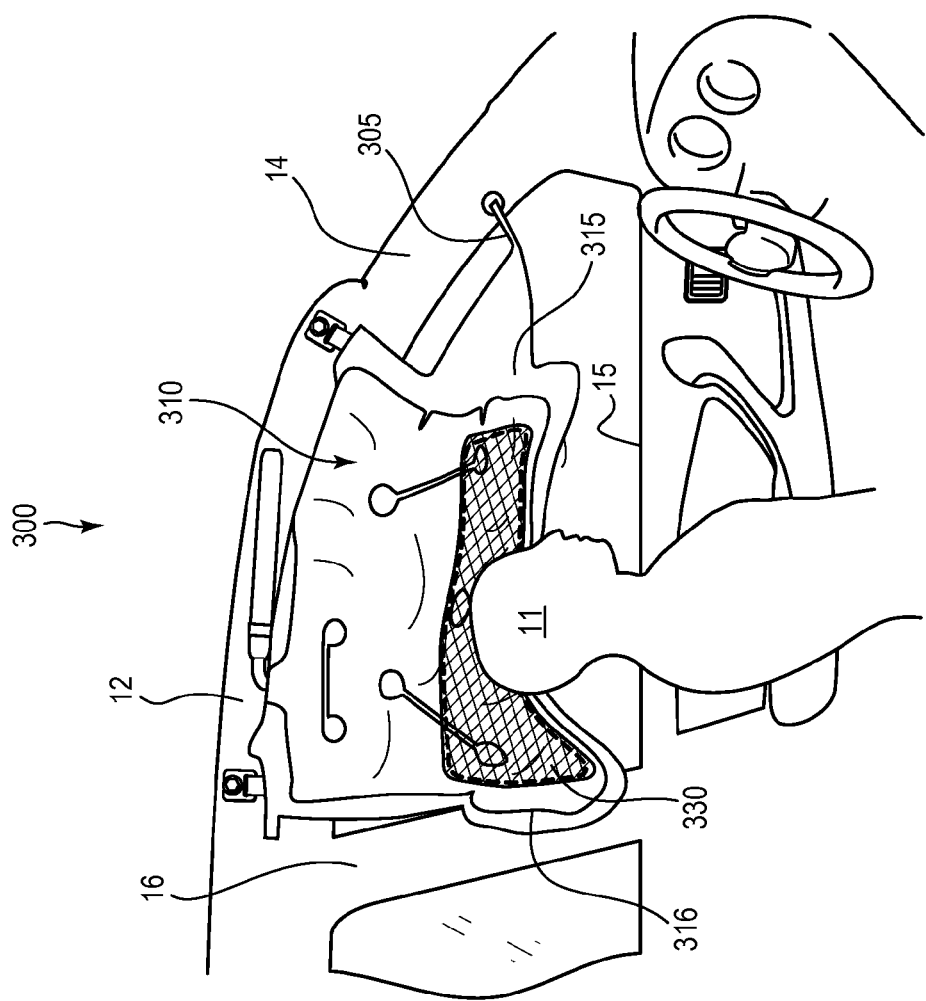
FIG. 12 is a perspective view of the airbag assembly of FIG. 10, at a later time during a collision scenario.

FIGS. 12-13 are a perspective view and a side view, respectively, of airbag assembly 300 of FIGS. 10-11, at a later time during a collision or rollover event. In the depicted figures, the head of occupant 11 has continued to travel in the outboard direction. Since airbag 310 is coupled to roof rail 12, as occupant 11 continues to push bottom portion 312 of airbag 310 out of the space formerly occupied by a window, the bottom portion of the airbag may tend to travel in a vertically upward direction and allow a gap to form between the bottom portion of the airbag and the beltline 15 of the vehicle. Also, since car-forward side 315 of airbag 310 is coupled to A-pillar 14 (via tether 305), car-rearward side 316 may tend to travel in a car-forward direction as the airbag is pushed in the outboard direction by occupant 11.

Thus, during a side impact or rollover event, bottom portion 312 of airbag 310 may tend to travel in a vertically upward direction and in a car-forward direction, relative to the head of occupant 11 and B-pillar 16. In other words, the head of occupant 11 may seem to travel in a vertically downward direction and a car-rearward direction, relative to bottom portion 312 of airbag 310. Anti-slip patch 330 is configured to reduce the travel of airbag 310 and the head of occupant 11 such that the occupant is retained within the vehicle.

Figure 14:
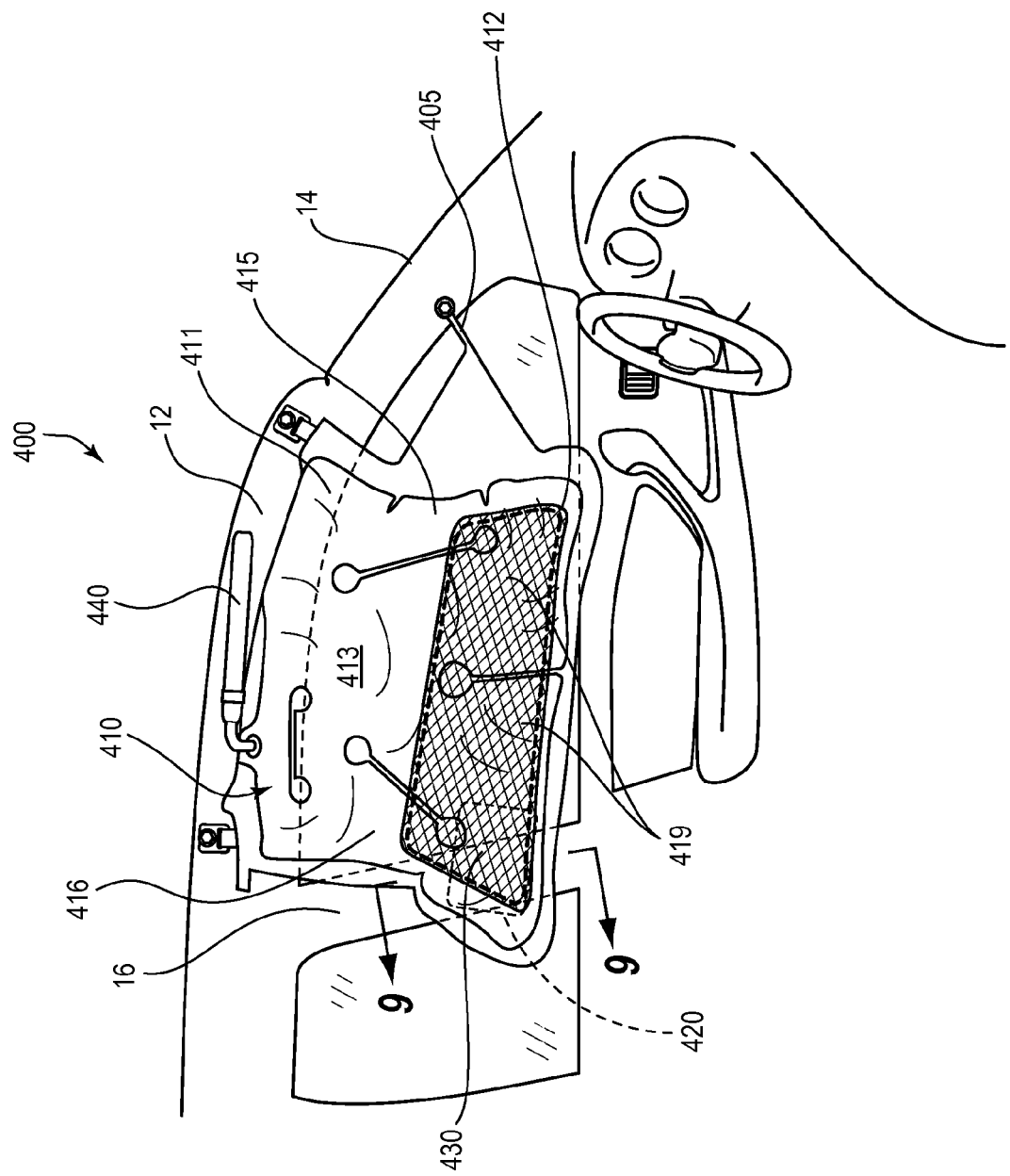
FIG. 14 is a perspective view of another embodiment of an airbag assembly, wherein the inflatable curtain airbag is in a deployed configuration.

FIG. 14 depicts airbag assembly 400 with anti-slip patches 420 and 430, wherein airbag assembly 400 and anti-slip patches 420 and 430 resemble airbag assemblies 100, 200, and 300, as well as anti-slip patches 120, 220, and 330 described above, in certain respects. Accordingly, like features may be designated with like reference numerals, with the leading hundreds numeral incremented from "1" or "2" or "3" to "4". Any suitable combination of the features described with respect to airbag assemblies 100, 200, or 300 and anti-slip patches 120, 220, 320, or 330 can be employed with assembly 400 and anti-slip patches 420 and 430, and vice versa.

FIG. 14 is a perspective view of another embodiment of an airbag assembly 400, wherein the assembly comprises an inflatable curtain airbag 410, an outboard anti-slip patch 420, inboard anti-slip patch 430, and an inflator 440. Inflatable curtain airbag 410 is depicted in an inflated, deployed configuration and may be mounted adjacent a vehicle roof rail 12 of a vehicle. Assembly 400 may further comprise one or more external tethers 405. In the depicted embodiment, airbag 410 is an inflatable curtain airbag cushion, which extends from an A-pillar 14 to a B-pillar 16. In other embodiments, inflatable curtain airbag 410 may extend from an A-pillar to a C-pillar or a D-pillar, if present.

Inflatable curtain airbag 410 is configured to become inflated upon activation of one or more inflators such that the inflatable curtain airbag transitions from the packaged configuration to the deployed configuration. Inflatable curtain airbag 410 may be described as having an upper portion 411, a lower portion 412, an inboard panel 413, an outboard panel (not visible), and a throat portion, which may also be called an inflator attachment portion. The throat portion may be closed around inflator 440, and the inflator mounted to the roof rail of the vehicle via an inflator mounting bracket. The various panels of inflatable curtain airbag 410 define an interior inflatable void 418, which is in fluid communication with inflator 440. The inflatable void may be divided into inflation cells 419. The various panels of inflatable curtain airbag 410 may comprise panels of a woven nylon fabric that are coupled together at a seam.

Anti-slip patches 420 and 430 may comprise pieces of material or substances coupled to inflatable curtain airbag 410. Anti-slip patches 420 and 430 may comprise identical, similar, or different materials or substances. Anti-slip patch 420 functions to increase friction between the airbag to which it is coupled and a vehicle structure, such as a B-pillar. Anti-slip patch 430 functions to increase friction between the airbag to which it is coupled and an occupant. In case of a collision or rollover, an occupant may strike airbag 410. On a car-forward side 415, airbag 410 is tethered to A-pillar 14 via tether 405; however, on a car-rearward side 416, lower portion 412 of airbag 410 is not attached to a vehicle structure, such as B-pillar 16. As such, airbag 410 may swing toward the outboard side of the vehicle, and an occupant may be ejected from the vehicle by passing airbag 410 and exiting via a window. Anti-slip patch 420 is configured to increase an amount of energy required to push airbag 410 toward and/or through an outboard side window by increasing friction between the airbag and a vehicle structure. Anti-slip patch 430 is configured to increase an amount of energy required for an occupant to slide down airbag 410 and be ejected from the vehicle between the bottom portion of the airbag and a beltline or window sill of the vehicle.

Anti-slip patch 420 may be located at any suitable position on airbag 410. Likewise, anti-slip patch 430 may be centered on airbag 410 or may be biased toward car-forward side 415 or car-rearward side 416. One skilled in the art will recognize that the size and shape of the anti-slip patches may be varied according to different embodiments. Likewise, the location of the anti-slip patches may be varied.

Figure 15:
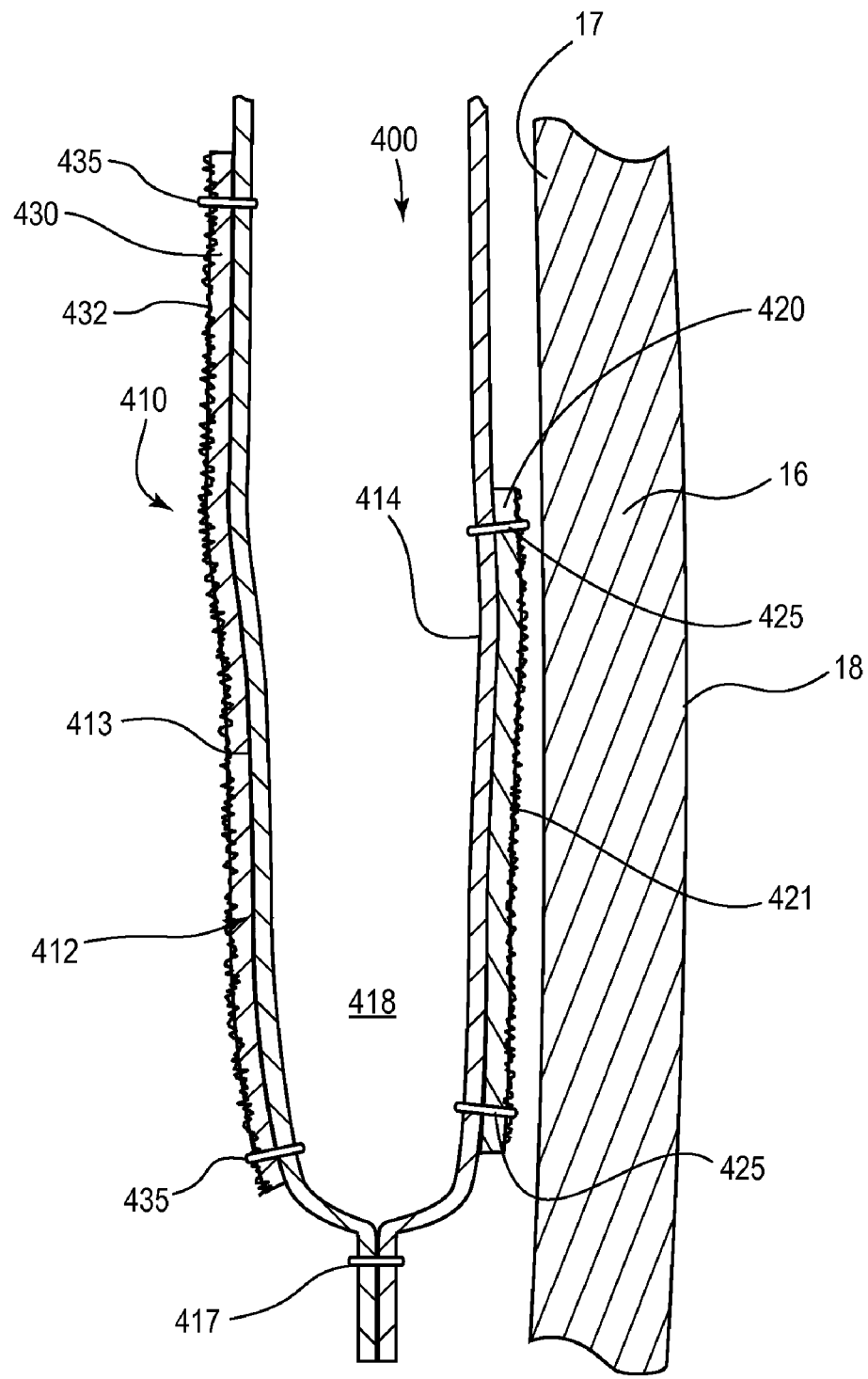
FIG. 15 is a cross-sectional view of the airbag assembly of FIG. 14.

FIG. 15 is a cross-sectional view of a portion of airbag assembly 400. Inflatable airbag curtain 410 is depicted in a deployed and inflated configuration, wherein the airbag is located adjacent to vehicle B-pillar 16, which comprises an inboard side 17 and an outboard side 18. Airbag 410 comprises inboard panel 413 and outboard panel 414, which are coupled together at seam 417 to form an inflatable void 418. Anti-slip patch 420 comprises an outboard anti-slip patch coupled to airbag 410 via stitching 425. Anti-slip patch 420 comprises an outboard side that is configured to interact with inboard side 17 of B-pillar 16. Anti-slip patch 430 comprises an inboard anti-slip patch that is coupled to bottom portion 412 of airbag 410 via stitching 435. Inboard side 432 of anti-slip patch 430 is configured to interact with an occupant during a collision scenario. In another embodiment, the anti-slip patch may comprise an entirety of the outboard panel and/or inboard panel.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly, comprising:
an inflatable curtain airbag comprising an upper portion and a lower portion, wherein the inflatable curtain airbag comprises an outboard panel and an inboard panel,
wherein the inflatable airbag assembly has sufficient longitudinal length to extend between an "A" pillar and a "B" pillar of a vehicle upon deployment,
wherein an anti-slip patch is located at the lower portion and the outboard panel,
wherein the anti-slip patch has a higher coefficient of friction as compared with surfaces of the airbag adjacent to the anti-slip patch at the lower portion and as compared with surfaces of the upper portion, and
wherein the anti-slip patch is configured and positioned to interact with the "B" pillar of a vehicle upon deployment of the inflatable airbag assembly and is configured to provide greater friction between the inflatable curtain airbag and the "B" pillar than surfaces of the airbag adjacent to the anti-slip patch and surfaces of the upper portion adjacent to the "B" pillar during deployment.

2. The inflatable airbag assembly of claim 1, wherein the anti-slip patch comprises a coating adhered to an outboard panel of the inflatable curtain airbag.

3. The inflatable airbag assembly of claim 1, wherein the anti-slip patch comprises a piece of material coupled to an outboard panel of the airbag.

4. The inflatable airbag assembly of claim 1, wherein the anti-slip patch comprises silicone.

5. The inflatable airbag assembly of claim 1, wherein the anti-slip patch comprises a rubberized material.

6. The inflatable airbag assembly of claim 1, wherein the airbag assembly comprises a plurality of anti-slip patches.

7. An inflatable airbag assembly, comprising:
an inflatable curtain airbag comprising an upper portion and a lower portion, wherein the inflatable curtain airbag comprises an outboard panel and an inboard panel,
wherein the inflatable curtain airbag has sufficient longitudinal length to extend between an "A" pillar and a "B" pillar of a vehicle upon deployment,
wherein an anti-slip patch is located at the lower portion and the inboard panel,
wherein the anti-slip patch has a higher coefficient of friction as compared with any surfaces of the upper portion that may contact an occupant during deployment, and
wherein the anti-slip patch is configured and positioned to interact with a vehicle occupant upon deployment of the inflatable airbag assembly and is configured to provide greater friction between the inflatable curtain airbag and the vehicle occupant than surfaces of the upper portion during deployment.

8. The inflatable airbag assembly of claim 7, wherein the anti-slip patch comprises a coating adhered to the inboard panel of the inflatable curtain airbag.

9. The inflatable airbag assembly of claim 7, wherein the anti-slip patch comprises a piece of material coupled to the inboard panel of the airbag.

10. The inflatable airbag assembly of claim 7, wherein the anti-slip patch comprises silicone.

11. The inflatable airbag assembly of claim 7, wherein the anti-slip patch comprises a rubberized material.

* * * * *